United States Patent [19]

Karikawa et al.

[11] 4,032,938
[45] June 28, 1977

[54] MINIATURE SINGLE LENS REFLEX CAMERA

[75] Inventors: Tohru Karikawa; Koichi Kobayashi, both of Tokyo, Japan

[73] Assignee: Asahi Kogaku Kogyo Kabushiki Kaisha, Tokyo, Japan

[22] Filed: June 15, 1976

[21] Appl. No.: 696,443

[30] Foreign Application Priority Data

June 20, 1975  Japan .................... 50-84778[U]

[52] U.S. Cl. ................ 354/155; 354/152; 354/225
[51] Int. Cl.² ............................................ G03B 19/12
[58] Field of Search .......... 354/152, 154, 155, 219, 354/224, 225

[56] References Cited

UNITED STATES PATENTS

| | | | |
|---|---|---|---|
| 2,828,664 | 4/1958 | Hoch .............................. | 354/225 |
| 3,879,743 | 4/1975 | Wick et al. ..................... | 354/225 |
| 3,955,206 | 5/1976 | Hashimoto ..................... | 354/152 |
| 3,956,759 | 5/1976 | Karikawa ....................... | 354/152 X |

*Primary Examiner*—John Gonzales
*Attorney, Agent, or Firm*—Sughrue, Rothwell, Mion, Zinn & Macpeak

[57] ABSTRACT

A miniature single lens reflex camera using cassette film is disclosed. The camera can be operated with inexpensive lenses not having large back focus, due to the addition of a glass block between the shutter and the film plane. The finder optical system is short in actual length due to the combination of a trapezoidal prism, a right angle prism, and an equilateral prism.

3 Claims, 2 Drawing Figures

MINIATURE SINGLE LENS REFLEX CAMERA

BACKGROUND OF THE INVENTION

The present device relates to a miniature single lens reflex camera using a film cassette of small size.

There are several problems to be solved before achieving a practical single lens reflex camera of the type which not only uses a small film cassette having film feed and take-up chambers projecting forward from both sides and connected to each other by means of a bridge, but also includes a shutter of the slide type (or the so-called "guillotine shutter") arranged in front of said film cassette, and does not have a bulged portion often found in single lens reflex cameras for accommodating a roof-shaped prism.

One of the problems is that the photographing lens system, which is positioned in front of either a translucent mirror or a retractable totally reflecting mirror must have a large distance (so-called "back focus length") between its rear end and the frame position of the film in comparison with the size of the frame. The relatively long distance is necessary to provide room for the angled mirror, which reflects light to the finder optical system and must be positioned between the photographic lens system and the shutter, and for the projecting film feed and take up reels of the cassette. The latter provide a limit on the closeness of the film frame to the shutter. Under such conditions it is quite difficult to assemble the photographing lens system as above even with the use of a common lens of retrofocusing type. Although not impossible, this assembly requires excessively high techniques in the design of the lens system and becomes accordingly expensive.

Another problem is due to the attempts to assemble a finder optical system without formation of the above-mentioned bulged portion as is common in single lens reflex cameras. It is a common practice to provide a basic construction such that the light is guided sideways before and along the shutter, turned by a prism, and further guided backward into an eyepiece lens along the side of the film cassette. In such case, it is also common to focus the light by a first lens and then convert the image to an erect image by a second lens. This type of construction generally lengthens the optical path so much that the resultant finder optical system is not suitable for a small camera.

SUMMARY OF THE INVENTION

It is, therefore, an object of the present device to provide an effective assembly for a photographing optical system and a finder optical system which will result in a practical miniature single lens reflex camera. In accordance with the present invention a glass block having flat transmitting surfaces is placed between the shutter and the film frame. This lengthens the path between the photographing lens system and the focal plane, thereby permitting the use of less expensive lens systems, i.e. those having relatively small back focus. Also, in the finder optical system, a trapezoidal prism, a right angled prism, and an equilateral prism are used in combination to increase the optical path while shortening the actual distance between a second finder focusing lens and the eyepiece.

DETAILED DESCRIPTION OF THE DRAWINGS

Figure 1:
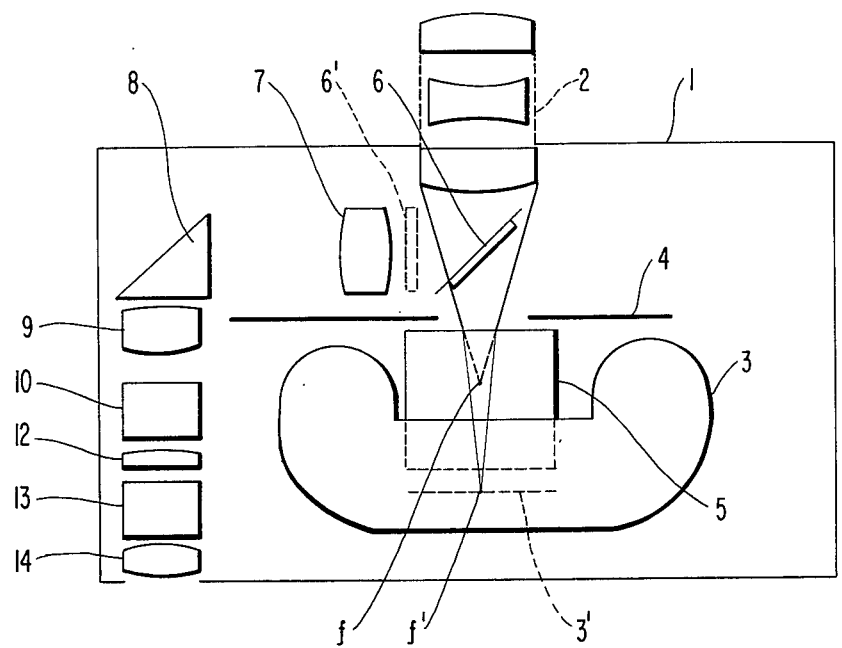
FIG. 1 is a top plan view showing the optical construction arrangement of a camera exemplifying the present invention.
Figure 2:
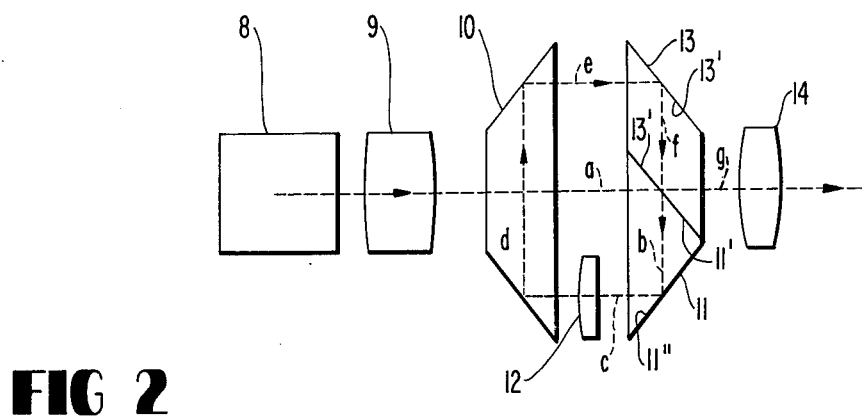
FIG. 2 is a side elevation of the finder optical system of the camera of FIG. 1.

The camera according to the present device will now be described in more detail in connection with its embodiment as shown in the accompanying drawing. FIG. 1 is an illustrative plan view showing a preferred embodiment of the camera according to the present device. A shutter 4 is interposed between a photographing lens system 2 of a camera body 1 and a film cassette 3, which has its film feed and take-up portions projecting forward. A mirror 6 is disposed at an angle of inclination in an optical path leading from the photographing lens system 2. A glass block 5, formed with parallel transparent surfaces, is interposed between the shutter 4 and the aperture 3' of the cassette 3. The effect of glass block 5 can be seen by assuming that the photographic lens system 2 has a back focus which focuses the light at point $f$, in the absence of block 5. The refractive effect of the glass block 5 moves the focal point back to $f'$. The distance $ff'$ is given by:

$$\overline{ff'} = \frac{n-1}{n} d \; ;$$

where $n$ is the refractive index of the block 5 and $d$ is the thickness of the glass block 5. Thus it can be appreciated that, since the minimum distance between the lens system 2 is determined by the space requirements of the angled mirror and the projecting feed and take-up reels, the glass block permits the use of lens systems with shorter back focus lengths.

In the reflected optical path formed by the mirror 6, there are arranged, a first focusing lens 7 and a second lens 9, positioned downstream of a reflecting prism 8, for obtaining an erect image. There are interposed between the second lens 9 and an eyepiece lens 14, a trapezoidal prism 10, a right-angled prism 11, a focusing plate 12 and an equilateral prism 13. More specifically, the trapezoidal prism 10 has its transparent center portion arranged in alignment with the optical axis of the second lens 9 to face the same. The right-angled prism 11 is so arranged that its incident surface faces the surface of the trapezoidal prism 10, from which the light emanates, and that its one side 11' acting as a totally reflecting surface intersects with the optical axis. The focusing plate 12 is located in such an optical path as leads from the other totally reflecting surface 11" of the right-angled prism 11 to the trapezoidal prism 10. On the other hand, the equilateral prism 13 is so arranged that its incident surface faces the emanating surface of the trapezoidal prism 10, and one surface 13' of its parallel, totally reflecting surfaces mates with the totally reflecting surface 11' of the right-angled prism 11 and intersects with the optical axis. Alternatively, the equilateral prism 13 may be positioned apart from the right-angled prism 11.

In the camera having the above construction, the light of an object having passed through the photographing lens system 2 is reflected sideways by the mirror 6, which is inclined in the optical path as illustrated when in the preparatory condition for photography. The light thus reflected is focussed by the first lens 7 to form an image which has a smaller size than that of the image which will fall on the film surface. The optical path is then deflected by the action of the reflecting prism 8, and the image is inverted to be erect by the second lens 9. As described above, the trapezoidal prism 10 is arranged downstream of the lens 9, and the light having passed through the transparent portion of the prism 10 at (a) will enter the right-angled prism 11. In prism 11, the light is reflected and deflected downwardly at (b) by the action of the totally reflecting surface 11', and then is reflected forwardly at (c) by the action of the other reflecting surface 11" so that it may be focussed by the focusing plate 12. Furthermore, the light thus focussed is reflected upward at (d) and then backward at (e) by the action of the trapezoidal prism 10 to enter the equilateral prism 13. The light is then reflected downward at (f) by totally reflecting surface 13" and then backward to pass through the eyepiece lens 11.

In the photographing condition, on the other hand, the mirror 6 is retracted to its position 6' as shown in broken lines in FIG. 1, so that the light may pass through the glass block 5 under the aperture control of the shutter 4 until it reaches the film surface at the aperture portion 3' of the film cassette 3.

As seen from the above description, it should be appreciated as an advantage of the present device that, since a glass block formed with lateral transmitting surfaces is interposed between the shutter and the film surface, the effective length of the optical path between the photographing lens system and the film surface can be effectively increased. This makes it possible to use a common, inexpensive lens of miniature size without resorting to an expensive lens of the retrofocusing type which has an elongated "back focus". It should also be appreciated as another advantage of the present device that, since there are interposed between the second lens and the eyepiece lens of the finder optical system a trapezoidal prism, a right-angled prism and a equilateral prism, all of which are combined skillfully, the actual length of the finder optical system can be reduced remarkably in comparison with the length of the optical path obtainable, thus making it possible to produce a miniature single lens reflex camera.

What is claimed is:

1. A miniature single lens reflex camera of the type having, a portion for receiving a film cassette with a picture aperture portion, a slide type shutter positioned in front of said receiving portion, an angled mirror in front of said shutter for directing light from the object to a finder optical system located to one side of said receiving portion, said finder optical system including at least an eyepiece and a focusing lens located optically upstream of said eyepiece, the improvement comprising,
   a. a glass block having parallel transparent surfaces positioned in the photographic optical path between said shutter and said picture aperture portion of said film cassette, and
   b. the combination of a trapezoidal prism, a right angled prism and an equilateral prism positioned between said focusing lens and said eyepiece in an arrangement to cause the optical path length between said lens and eyepiece to be substantially greater than the physical distance therebetween.

2. A camera as claimed in claim 1 wherein said trapezoidal prism has a transparent center portion arranged in alignment with the optical axis of said focusing lens, said right angled prism positioned to have its light incident surface facing the light emanating surface of said trapezoidal prism and having a first totally reflecting side intersect with the optical axis to reflect light to a second totally reflecting side, said equilateral prism positioned to have its light incident surface facing the light emanating surface of said trapezoidal prism and having first and second parallel totally reflecting surfaces, one of which mates with said first reflecting side of said right angled prism.

3. A camera as claimed in claim 2 further comprising a focusing plate positioned in the optical path between said second reflecting side of said right-angled prism and said trapezoidal prism.

* * * * *